(12) United States Patent
Trofimuk et al.

(10) Patent No.: US 11,767,476 B1
(45) Date of Patent: Sep. 26, 2023

(54) SYSTEMS AND METHODS FOR CRUDE OIL DESALTING AND DEHYDRATION IN A VERTICAL VESSEL

(71) Applicant: VME Process, Inc., Tyler, TX (US)

(72) Inventors: Terrance John Larry Trofimuk, Calgary (CA); Fiona McGregor, Calgary (CA); Michael Thomas, Tyler, TX (US)

(73) Assignee: VME Process, Inc., Tyler, TX (US)

( * ) Notice: Subject to any disclaimer, the term of this patent is extended or adjusted under 35 U.S.C. 154(b) by 0 days.

(21) Appl. No.: 17/859,890

(22) Filed: Jul. 7, 2022

(51) Int. Cl.
| | | |
|---|---|---|
| *C10G 33/00* | (2006.01) | |
| *C10G 33/06* | (2006.01) | |
| *C10G 33/08* | (2006.01) | |
| *C10G 31/08* | (2006.01) | |
| *C10G 33/02* | (2006.01) | |
| *B01D 17/06* | (2006.01) | |
| *B01D 17/02* | (2006.01) | |
| *B01D 17/04* | (2006.01) | |

(52) U.S. Cl.
CPC ......... *C10G 33/08* (2013.01); *B01D 17/0214* (2013.01); *B01D 17/045* (2013.01); *B01D 17/06* (2013.01); *C10G 31/08* (2013.01); *C10G 33/02* (2013.01); *C10G 33/06* (2013.01); *C10G 2300/1033* (2013.01); *C10G 2300/201* (2013.01); *C10G 2300/4056* (2013.01)

(58) Field of Classification Search
CPC ......... C10G 33/00; C10G 33/06; C10G 33/08
See application file for complete search history.

(56) References Cited

U.S. PATENT DOCUMENTS 2,730,240 A * 1/1956 Johnson ................. B01D 17/12
210/194

\* cited by examiner

*Primary Examiner* — Randy Boyer

(57) ABSTRACT

A system for crude oil desalting and dehydration includes a separation vessel defining a cavity extending along a central axis having a substantially-vertical orientation. The separation vessel comprises a first distributor configured to distribute a mixture within the cavity of the separation vessel, and a second distributor configured to distribute a wash fluid within the cavity of the separation vessel. The mixture comprises crude oil, water, dissolved salts, free salts, or combinations thereof, and the wash fluid comprises an aqueous fluid. The first distributor is disposed within the cavity below the second distributor, and an interface level controller is configured to detect an interface between an oil phase and an aqueous phase and to maintain the interface within a predetermined range within the cavity.

19 Claims, 8 Drawing Sheets

SYSTEMS AND METHODS FOR CRUDE OIL DESALTING AND DEHYDRATION IN A VERTICAL VESSEL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some geographical areas, fluid produced from a well may be a crude oil, or "crude," having substantial quantities of water and undesired substances, such as salt. In some instances, the salt and water content may be so high as to interfere with subsequent transportation, storage, and refinement of the crude. Salt and water in the crude may be highly deleterious to some metal equipment and piping and product specifications often limit the allowable level of salt and water in the crude oil.

SUMMARY

In some embodiments, a system for crude oil desalting and dehydration comprises a separation vessel defining a cavity extending along a central axis having a substantially-vertical orientation. The separation vessel comprises a first distributor configured to distribute a mixture within the cavity of the separation vessel, and a second distributor configured to distribute a wash fluid within the cavity of the separation vessel. The mixture comprises crude oil, water, dissolved salts, free salts, or combinations thereof, and the wash fluid comprises an aqueous fluid. The first distributor is disposed within the cavity below the second distributor, and an interface level controller is configured to detect an interface between an oil phase and an aqueous phase and to maintain the interface within a predetermined range within the cavity.

In some embodiments, a method of desalting and dehydrating crude oil comprises distributing a mixture within a cavity of a separation vessel, distributing a wash fluid within the cavity of the separation vessel, detecting an interface between an oil phase and an aqueous phase, and maintaining the interface within a predetermined range within the cavity. The mixture comprises crude oil, water, dissolved salts, free salts, or combinations thereof, and the wash fluid comprises an aqueous fluid. The separation vessel defines the cavity extending along a central axis that has a substantially-vertical orientation, and the mixture is distributed within the cavity below the wash fluid.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
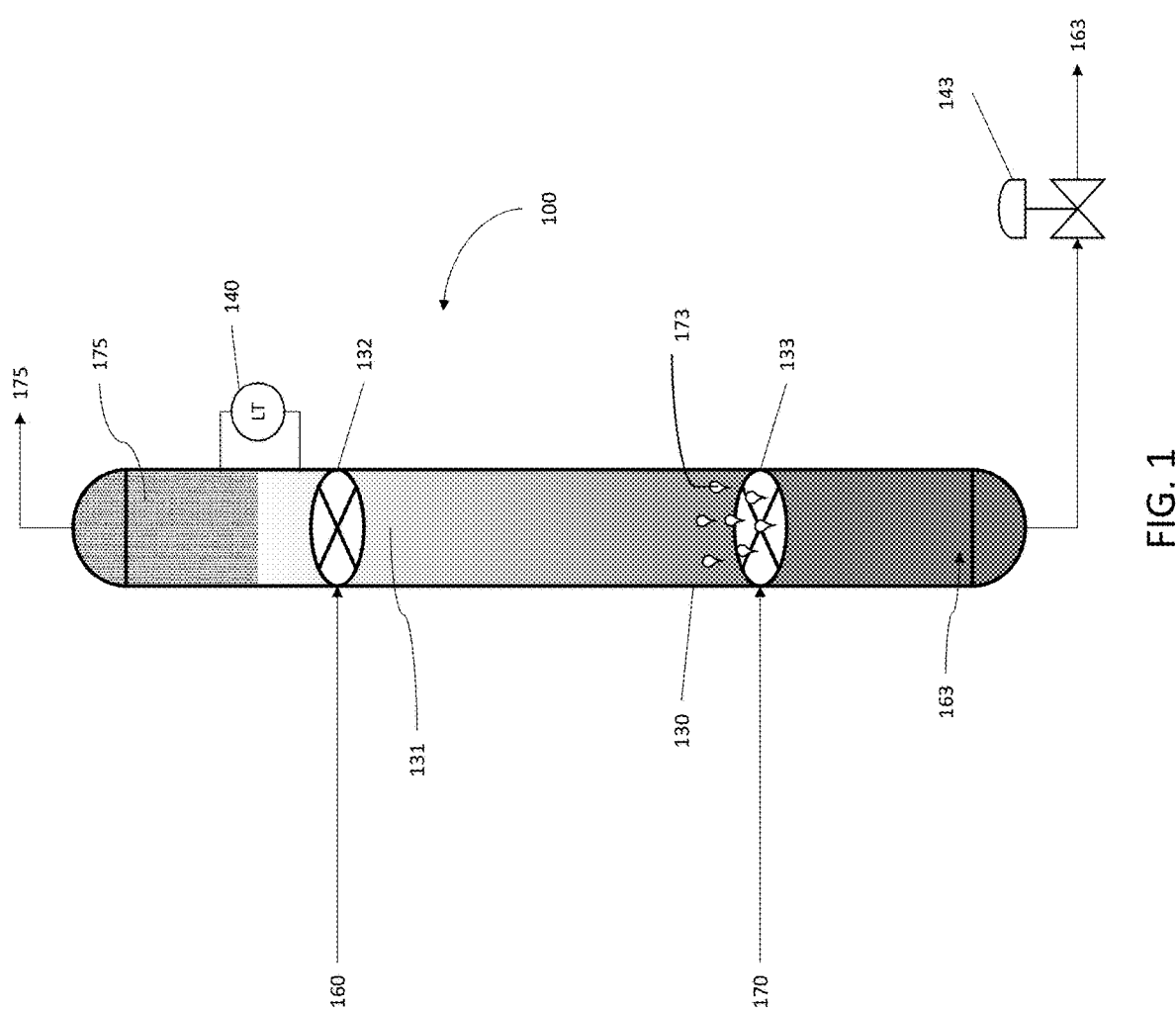
FIG. 1 illustrates a schematic view of a system including a separation vessel according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Overview

Crude oil can be extracted from a well as a stream of fluid(s), which may include not only the crude oil, but also other substances such as water, gas, and salt. The proportions of water, gas, oil, and salt in the stream from the well may vary according to the circumstances of the particular well over the life of the field. A mixture of water and salt may typically be in the form of droplets carried in the oil, and salt may be contained within the oil phase itself. It may be desirable to isolate and remove at least some of the salt from the crude oil. Separating the salt from the mixture can use an aqueous fluid to dilute the salt contained in the mixture followed by separating the aqueous phase from the mixture. Typical two-stage desalting systems and/or processes may utilize two separate vessels in connection with equipment external to each vessel for injection of freshwater or dilution water in between. This configuration often requires large vessels and interconnecting piping and controls, which add cost, weight, and complexity to the process. Frequently, the desalting process is carried out on a production platform where space and weight are at a premium.

Embodiments of the present disclosure include a system for desalting, and optional dehydration, of crude oil. The system may include a separation vessel generally configured to separate crude oil, water, and/or salts from a mixture. The separation vessel may be characterized as having a vertical or substantially vertical orientation. In some embodiments, the system may be configured to disperse the crude oil within a wash fluid such as an aqueous fluid, for example, such that the crude oil forms a dispersed phase within a continuous phase of the wash fluid, or alternatively a continuous phase having a dispersed phase of the wash fluid. In operation, the crude oil can move upward within the separation vessel through the wash fluid, for example, in a countercurrent flow due to a density differential between the crude oil and the wash fluid. As the crude oil moves upward through the wash water phase, salt within the crude oil droplets can reach the surface of the droplets and transfer into the surrounding wash fluid, thus reducing the dissolved salts within the crude oil. As the dispersed crude oil droplets reach the top of the separation vessel, the crude oil droplets pass through an interface between the mixed wash fluid and the crude oil and coalesce into a continuous crude oil phase at an upper portion of the vessel. Similarly, the wash fluid can pass downwards in the vessel and form a continuous wash fluid phase at a lower portion of the vessel. The dehydrated and/or desalted crude oil can be removed from an upper portion of the separation vessel, and the wash fluid can be removed from a lower portion of the separation vessel.

In some embodiments, the system may be configured to disperse the wash fluid within the crude oil, for example, such that the wash fluid forms a dispersed phase within a continuous phase of the crude oil. In operation, the dispersed wash water droplets move downward within the separation vessel through the crude oil, for example, a countercurrent flow due to a density differential between the crude oil and the wash fluid. As the wash fluid droplets move downward through the continuous crude phase, the dispersed wash fluid droplets may encounter water within the crude oil and the water within the crude oil may coalesce into the wash fluid droplets, thus reducing the water and dissolved salts within the crude oil. As the dispersed wash fluid droplets reach the bottom of the separation vessel, the wash fluid droplets pass through an interface between the continuous crude oil and the wash fluid, coalescing into the wash fluid. The dehydrated and/or desalted crude oil can be removed from an upper portion of the separation vessel, and the wash fluid can be removed from a lower portion of the separation vessel.

Additionally, in some embodiments, the separation vessel may include one or more additional components to improve contact between the dispersed and continuous phases. For example, in some embodiments the separation vessel may further comprise packing, one or more liquid redistribution trays, an oil coalescer, a water coalescer, a chemical treatment for the wash fluid, a chemical treatment for the crude oil, or combinations thereof. Additionally or alternatively, in some embodiments the separation vessel may be configured to electrostatically coalesce water within the crude oil, for example, via one or more electrostatic devices. Additionally or alternatively, in some embodiments the separation vessel may be configured to heat or cool one or both of the wash fluid or the crude oil, for example, such that the wash fluid and/or the crude oil is within a desired temperature range for desalting and/or dehydration. Other equipment and chemical injection points may be used to further aid in the desalting of the oil.

Additionally or alternatively, in some embodiments the system for desalting and dehydration of crude oil may be configured for multi-stage, e.g., two-stage, separation. For example, the system may have a distributed configuration, for example, including the separation vessel and a preliminary separation vessel. The separation vessel and the preliminary separation vessel may be fluidically coupled, for example, to exchange crude oil and the wash fluid between the separation vessel and the preliminary separation vessel.

Referring to FIG. 1, an embodiment of a system 100 for crude oil desalting and dehydration is disclosed. The system 100 comprises a separation vessel 130 defining a cavity 131 generally extending along a central axis. In the embodiment of FIG. 1, the central axis extends vertically or substantially vertically, for example, such that the cavity 131 has a vertical or substantially vertical orientation.

In an embodiment, the separation vessel 130 may be configured to receive a crude oil stream, for example, a mixture which may contain crude oil water, dissolved salts, and/or free solids. For example, in the embodiment of FIG. 1, the separation vessel 130 comprises a distributor 133. The distributor 133 is disposed within the cavity 131 and is configured to receive the mixture and provide a route of fluid communication into the cavity 131 via one or more inlets of the distributor 133. For example, in an embodiment, the distributor 133 may comprise a distribution header having a plurality of perforations that allow for fluid communication of the incoming mixture into the cavity 131. In various embodiments, the perforations may be sized to disperse the crude oil within a wash fluid, as will be disclosed herein.

In an embodiment, the separation vessel 130 may also be configured to receive a wash fluid. In an embodiment, the wash fluid may be an aqueous fluid, for example, water. The aqueous fluid can contain some amount of salt (e.g., a recycled wash fluid) and/or other chemicals to aid in the desalting of the crude and/or separation of the phases at the upper and lower portions of the separation vessel 130. The wash fluid, for example, water, may be characterized as having a low solute concentration. In some aspects, the wash fluid may be substantially free of dissolved salts. In the embodiment of FIG. 1, the separation vessel 130 comprises a distributor 132. The distributor 132 is disposed within the cavity 131 and is configured to receive the wash fluid and provide a route of fluid communication into the cavity 131 via one or more inlets of the distributor 132. For example, in an embodiment, the distributor 132 may comprise a distribution header having a plurality of perforations that allow for fluid communication of the incoming wash fluid into the cavity 131.

In the embodiment of FIG. 1, the distributor 133 is positioned within the cavity below the distributor 132, for example, such that the mixture is introduced into the cavity at a point below the point at which the wash fluid is introduced into the cavity 131.

In the embodiment of FIG. 1, the separation vessel 130 is configured to maintain the wash fluid as a continuous phase and to maintain the crude oil as a dispersed phase within the cavity. For example, in the embodiment of FIG. 1, the separation vessel 130 includes an interface level controller 140. The interface level controller 140 may be configured to detect an interface between the continuous phase wash fluid and the crude oil that coalesces in an upper portion of the cavity 131, for example, an interface between an oil phase and an aqueous phase. In the embodiment of FIG. 1, the interface level controller 140 is configured to maintain the interface between the continuous phase wash fluid and the crude oil within a predetermined range, for example, at a predetermined level within the cavity 131. For example, the interface level controller 140 may maintain the interface level by controlling the operation of an interface level control valve 143, which is configured to allow a fluid to be withdrawn from a lower portion of the cavity 131.

In the embodiment of FIG. 1, in operation, a crude oil stream, for example, a mixture 170 comprising crude oil, water, dissolved salts, and/or free solids, can be introduced into the cavity 131 of the separation vessel 130 via the distributor 133. The distributor 133 can distribute the mixture 170 across a cross-sectional area of the cavity 131, for example, forming droplets 173 of the mixture at the same time. The droplets 173 may comprise, primarily oil with small amounts of water suspended within the droplets 173, for example, as an emulsion. The water may contain dissolved salts, and/or free salts.

The wash fluid 160 can be introduced into the cavity 131 of the separation vessel 130 via the distributor 132. The wash fluid 160 may enter the cavity 131 as an aqueous fluid. As water and/or salts from the mixture 170 are coalesced into the wash fluid 160, as disclosed herein, the salinity of the wash fluid 160 may increase as it approaches the lower portion of cavity 131. For example, in the lower portion of the cavity 131, the wash fluid may be characterized as a high-salinity fluid, for example, brine 163.

The droplets 173 enter the lower portion of the cavity 131 where they are surrounded by the brine 163. The difference in density between the droplets 173 and the brine 163 causes the droplets 173 to travel upwards through the continuous phase (the brine 163 or wash fluid 160) within cavity 131. As the droplets 173 travel upwards, they interact with the brine 163 and/or the wash fluid 160. For example, when the water contained in the droplets 173 reaches the surface of a droplet 173, it contacts the continuous phase (the brine 163 and/or wash fluid 160) and coalesce into the surrounding continuous phase, thus reducing the water content and salinity of the droplets 173.

As the droplets 173 approach the top of the cavity 131, the droplets 173 comprise, alternatively, consist essentially of, alternatively consist of, oil. As the droplets 173 continue to rise through the cavity 131, the droplets 173 pass through the interface between the continuous phase wash fluid and the crude oil, for example, coalescing into an oil phase near the top of the cavity 131, for example, forming the product oil 175. In various embodiments, the product oil 175 may be characterized as having less than 0.5-1%, by volume, water, or less than 28.6-286 milligrams of salt per liter of crude oil.

The level of the interface between the continuous phase wash fluid and the crude oil can be measured via the interface level controller 140 and may be controlled by controlling the removal of the brine 163 from the bottom of the cavity 131. For example, the level control valve 143 can be moved towards an open position to remove more brine when the interface rises above a set point, and the level control valve 143 can be moved towards a closed position when the interface falls below a set point. As previously noted, when the wash fluid 160 enters the cavity 131, it contains a lower levels of dissolved salts than the wash fluid leaving the separation vessel 130. As the wash fluid 160 travels downwards through the cavity 131, it increases in salinity to form the more concentrated brine 163, for example, as water and salts from the droplets 173 coalesce into the wash fluid 160. After passing below the distributor 133, the brine 163 can be removed, for example, under the control of the interface level controller 140, via the interface level control valve 143, to maintain the interface between the continuous phase wash fluid and the crude oil within a desired range and/or at a desired level.

In various embodiments, the flow rate of wash fluid 160, the flow rate of the mixture 170, the relative flow rates of the wash fluid 160 and the mixture 170, the rate of removal of the brine 163, the rate of removal of the product oil 175, or combinations thereof can be adjusted to obtain a desired removal of water and/or salts from the mixture 170.

Figure 2:
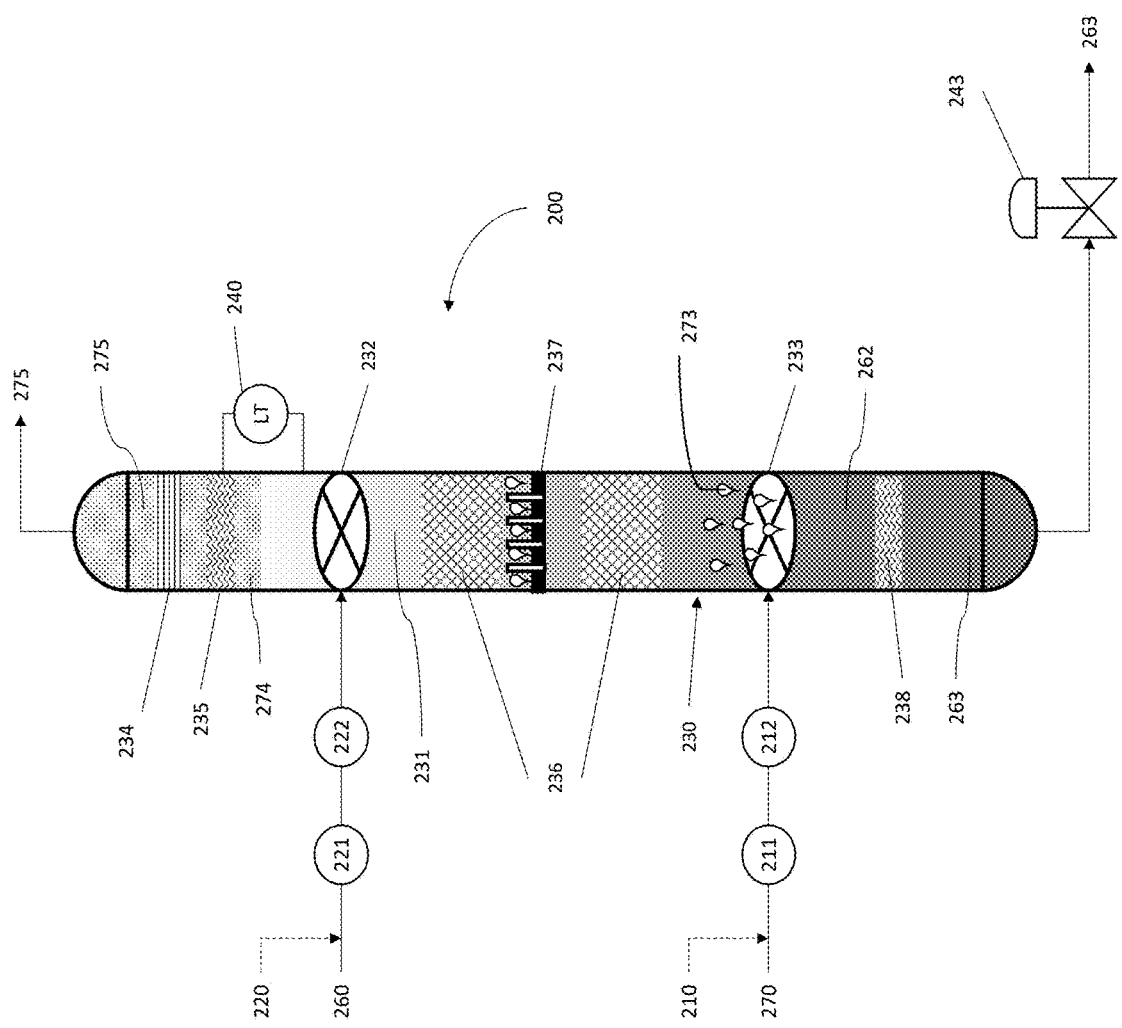
FIG. 2 illustrates a schematic view of a system including a separation vessel according to an embodiment of the disclosure.

Referring to FIG. 2, another embodiment of a system 200 for crude oil desalting and dehydration is disclosed, where the additional elements shown in FIG. 2 may each be optional additions to the system 100 of FIG. 1. As disclosed with respect to FIG. 1, the system 200 comprises a separation vessel 230 defining a cavity 231 generally extending along a central axis that extends vertically or substantially vertically, for example, such that the cavity 231 has a vertical or substantially vertical orientation. The separation vessel 230 also comprises one or more components as similarly disclosed with respect to FIG. 1, particularly, a distributor 233 disposed, a distributor 232, an interface level controller 240, and an interface level control valve 243.

Additionally or alternatively, in some embodiments, the separation vessel may include one or more additional, optional components to improve contact between the dispersed and continuous phases. For example, in the embodiment of FIG. 2, the separation vessel 230 may further comprise packing 236. In various embodiments, the packing 236 may be random, structured, or combinations thereof. The packing 236 may serve to increase the contact between the dispersed and continuous phases, and in some embodiments, the packing may enhance the mass transfer between the phases. The packing 236 may be disposed at one or more locations within the cavity, for example, between distributor 233 and the distributor 232.

Additionally or alternatively, in the embodiment of FIG. 2 the separation vessel 230 may further comprise a liquid redistribution tray 237, also disposed within the cavity 231 between that distributor 233 and the distributor 232. Additionally, in the embodiment of FIG. 2, the separation vessel 230 may further comprises a mechanical coalescer 235 and a mechanical coalescer 238. In the embodiment of FIG. 2, the mechanical coalescer 235 can be disposed in an upper portion of the cavity 231 and the mechanical coalescer 238 can be disposed in a lower portion of the cavity 231.

Additionally or alternatively, in the embodiment of FIG. 2 the separation vessel 230 may further comprise a wash fluid treatment 33020, a wash fluid mixer 221, a crude oil treatment 210, and/or a mixture mixer 36111. For example, in various embodiments, the wash fluid, the crude oil, or both may be treated via one or more chemical inputs effective to improve separation of the mixture. For example, in some embodiments the wash fluid treatment 220 may comprise a solvent, a polymer, etc. and/or demulsifying chemicals. A demulsifier may comprise a chemical that aids in separation of the water from an emulsion of water and crude oil and alters the kinetic stability by changing the interfacial film encapsulating the water droplets to allow the water droplets to separate from the crude oil. The wash fluid mixer 221 may be configured to mix and/or incorporate any treatment fluids into the wash fluid. Also, for example, in some embodiments, various treatment fluids can be injected into the crude oil such as the crude oil treatment 210, which can comprise a dilution fluid, a solvent, a polymer, etc. and/or demulsifying chemicals. The oil mixer 211 may be configured to mix and/or incorporate any treatment fluids into the crude oil.

Additionally or alternatively, in some embodiments the separation vessel 230 may be configured to electrostatically coalesce water within the crude oil, for example, via one or more electrostatic devices. In the embodiment of FIG. 2, the separation vessel 230 may further comprises an electrostatic grid assembly 234 disposed in an upper portion of the cavity 231. The electrostatic grid assembly 234 may comprise at least one electrical grid and at least one surface that can serve to produce a voltage potential with the electrostatic grid assembly 234 such as a baffle, perforated plate, grid, or the like. In some embodiments, the electrical grid may be configured to provide a surface area sufficient to produce a voltage potential between 1% and 100% of the surface area of the at least one surface, which may be grounded (e.g., at zero voltage) or at a voltage that provides at least a pre-defined voltage potential due to the relative voltage of the electrical grid. Each of the at least one surface and the electrical grid may define a plurality of openings in which flow paths (e.g., carrying the mixture) may pass through.

Additionally or alternatively, in some embodiments the separation vessel 230 may be configured to heat or cool one or both of the wash fluid or the crude oil, for example, such that the wash fluid and/or the crude oil is within an optimal temperature range for desalting and/or dehydration. In the embodiment of FIG. 2, the system 200 may further comprise a mixture heat exchanger 212 and/or a wash fluid heat exchanger 222. The mixture heat exchanger 212 may be configured to heat and/or cool the mixture to a desired temperature prior to or contemporaneous with introduction into the cavity 231 and, similarly, the wash fluid heat exchanger 222 may be configured to heat and/or cool the wash fluid to a desired temperature prior to or contemporaneous with introduction into the cavity 231.

In the embodiment of FIG. 2, in operation, one or more chemicals may be introduced into the mixture 270, for example, from the crude oil treatment 210, and mixed with the mixture 270, for example, via the mixture mixer 36111, to enhance the separability of the crude oil and the water and/or contaminants within the mixture 270. Additionally, in the embodiment of FIG. 2, the mixture 270 may be heated or cooled via the operation of the mixture heat exchanger 212.

Also, in the embodiment of FIG. 2, one or more chemicals may be introduced into the wash fluid 260, for example, from the wash fluid treatment 33020, and mixed with the wash fluid 260, for example, via the wash fluid mixer 221, to enhance the capability of the wash water to separate the crude oil and the water and/or contaminants within the mixture 270. Additionally, in the embodiment of FIG. 2, the wash fluid 260 may be heated or cooled via the operation of the wash fluid heat exchanger 222.

As similarly discussed with respect to FIG. 1, in the embodiment of FIG. 2, in operation, the mixture 270 is introduced into the cavity 231 of the separation vessel 230 via the distributor 233, forming droplets 273 of the mixture. The wash fluid 260 can be introduced into the cavity 231 of the separation vessel 230 via the distributor 232. The droplets 273 enter the lower portion of the cavity 231 where they are surrounded by the brine 262. The droplets 273 can travel upwards through the continuous phase (the brine 262 and/or wash fluid 260) within cavity 231, interacting with the brine 262 and/or the wash fluid 260, as discussed with respect to FIG. 1.

The interaction between the droplets 273 and the continuous phase (e.g., the brine 262 and/or wash fluid 260) can be enhanced by using one or more sections of the packing 236. Where multiple sections of packing 236 are utilized, the liquid redistribution tray 237 may be effective to redistribute the droplets 273 across the cross-sectional area of the cavity 231 between the sections of packing.

When the droplets 273 exit the packing 236, approaching the top of the cavity 231, the droplets 273 comprise, alternatively, consist essentially of, alternatively consist of oil. As similarly discussed with respect to FIG. 1, the droplets 273 continue to rise through the cavity 231 and pass through the interface between the continuous phase wash fluid and the pre-coalesced liquid 274. A mechanical coalescer can serve as a coalescer 235 and can be disposed within the cavity 231 near, for example, above, the interface between the continuous phase wash fluid and the crude oil, and may be used to enhance coalescence of the droplets 273.

In some embodiments, the crude oil may still contain unacceptable levels of water and/or salt. In the embodiment of FIG. 2, the electrostatic grid assembly 234 can be configured to create a voltage potential effective to electrostatically coalesce any water within the pre-coalesced liquid 274 into droplets, for example, such that the coalesced water droplets can be separated from the pre-coalesced liquid 274 to form the product oil 275. The electrostatic grid assembly 234 can use any suitable type of electrostatic grid and can create a voltage potential using AC or DC current supplied by an external power supply.

The level of the interface between the continuous phase wash fluid and the crude oil can be measured via the interface level controller 240 and may be controlled by controlling the removal of the brine 263 from the bottom of the cavity 231. As similarly discussed with respect to FIG. 1, the wash fluid 260 enters the cavity 231 containing relatively low levels of dissolved salts and increases in salinity to form the brine 262 as it travels downward through the cavity.

In the embodiment of FIG. 2, any oil present within the brine 262 may be coalesced via a mechanical coalescer 238, for example, to form larger oil droplets, which are able to rise against the downward velocity of the brine 262 more readily than smaller droplets. The brine 263 can be removed via the interface level control valve 243, to maintain the interface between the continuous phase wash fluid and the crude oil within a desired range and/or at a desired level.

Figure 3:
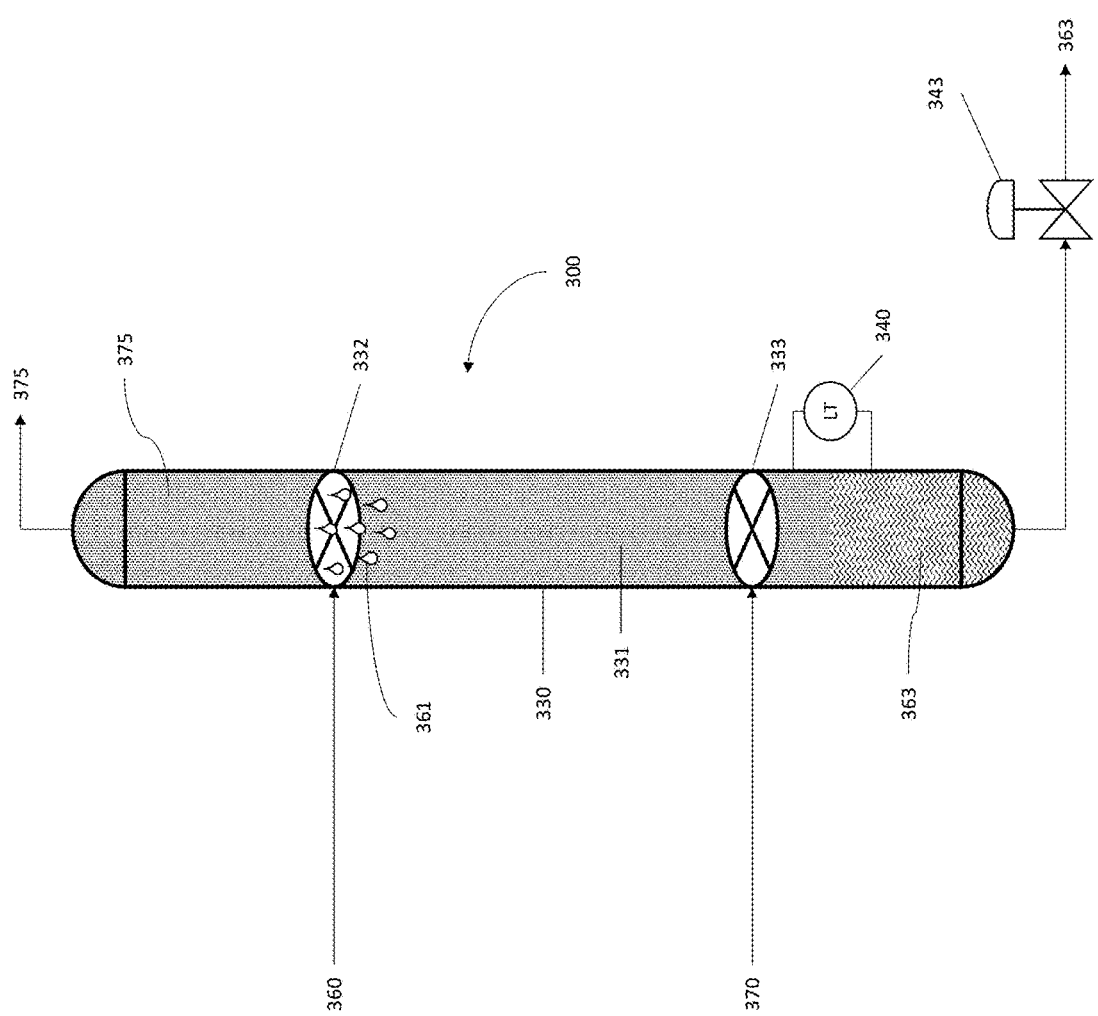
FIG. 3 illustrates a schematic view of a system including a separation vessel according to an embodiment of the disclosure.

Referring to FIG. 3, another embodiment of a system 300 for crude oil desalting and dehydration is disclosed. As disclosed with respect to FIG. 1, the system 300 comprises a separation vessel 330 defining a cavity 331 generally extending along a central axis that extends vertically or substantially vertically, for example, such that the cavity 331 has a vertical or substantially vertical orientation. The separation vessel 330 also comprises one or more components as similarly disclosed with respect to FIG. 1, particularly, a distributor 333 disposed, a distributor 332, and an interface level control valve 343, where similar parts can be the same or similar to those described with respect to FIG. 1.

In the embodiment of FIG. 3, the separation vessel 330 can be configured to maintain the crude oil as a continuous phase and to maintain the wash fluid as a dispersed phase within the cavity 331. For example, in the embodiment of FIG. 3, the separation vessel 330 includes an interface level controller 340. The interface level controller 340 may be configured to detect an interface between the continuous phase wash fluid and the crude oil. In the embodiment of FIG. 3, the interface level controller 340 can be configured to maintain the interface between the continuous phase wash fluid and the crude oil within a predetermined range, for example, at a predetermined level within the cavity 331. For example, the interface level controller 340 may maintain the interface level by controlling the operation of an interface level control valve 343, which is configured to allow a fluid to be withdrawn from a lower portion of the cavity 331.

As similarly discussed with respect to FIG. 1, in the embodiment of FIG. 3, in operation, a mixture 370 can be introduced into the cavity 331 of the separation vessel 330 via the first distributor 333. Likewise, the wash fluid 360 can be introduced into the cavity 331 of the separation vessel 330 via the distributor 332. The wash fluid 360 may enter the cavity 331 as an aqueous fluid, for example, containing relatively low levels of salts or substantially free of solutes such as salts. The distributor 332 can evenly distributes the wash fluid 360 across a cross-sectional area of the cavity 331, for example, forming wash fluid droplets 361.

Upon entering the cavity 331, the wash fluid droplets 361 contain relatively low levels of dissolved salts (e.g. relative to the wash fluid leaving the cavity 331). The difference in density between the wash fluid droplets 361 and the mixture 370 within the cavity 331 causes the wash fluid droplets 361 to travel downwards within the cavity 331. As the wash fluid droplets 361 travel downward through the cavity 331, they encounter pockets of water and/or contaminants within the continuous phase formed by the mixture 370 within the cavity 331. As the wash fluid droplets 361 travel downwards, they interact with the mixture 370, particularly, with the water and/or contaminants within the mixture 370. For example, the water and/or contaminants within the mixture 370 may coalesce with the wash fluid droplets 361, forming larger and saltier water droplets, which travel downward more easily, thus reducing the water content and salinity of the mixture 370.

As the mixture 370 approaches the top of the cavity 331, the mixture 370 may comprise, alternatively, consist essentially of, alternatively consist of oil. As the mixture 370 continues to rise through the cavity 331, water and salt can be stripped away from the mixture, forming the product oil 375.

As water and/or salts from the mixture 370 are transferred into the wash fluid droplets 361, the salinity of the wash fluid droplets 361 may increase as it approaches the lower portion of cavity 331. For example, as the wash fluid droplets 361 reach the lower portion of the cavity 331, the wash fluid droplets 361 may be characterized as a high-salinity wash fluid, for example, the brine 363. As droplets of the brine 363 approach the bottom of the cavity 331, the droplets of the brine 363 pass through the interface between the continuous phase crude oil and the brine 363, for example, coalescing into brine 363 phase near the bottom of the cavity 331.

The level of the interface between the continuous phase crude oil and the brine 363 can be measured via the interface level controller 340 and may be controlled by controlling the removal of the brine 363 from the bottom of the cavity 331. As the wash fluid droplets 361 travel downwards through the cavity 331, they increase in salinity to form the brine 363, which can be removed, for example, under the control of the interface level controller 340, via the interface level control valve 343, to maintain the interface between the continuous phase of the crude oil and the brine 363 within a desired range and/or at a desired level.

Figure 4:
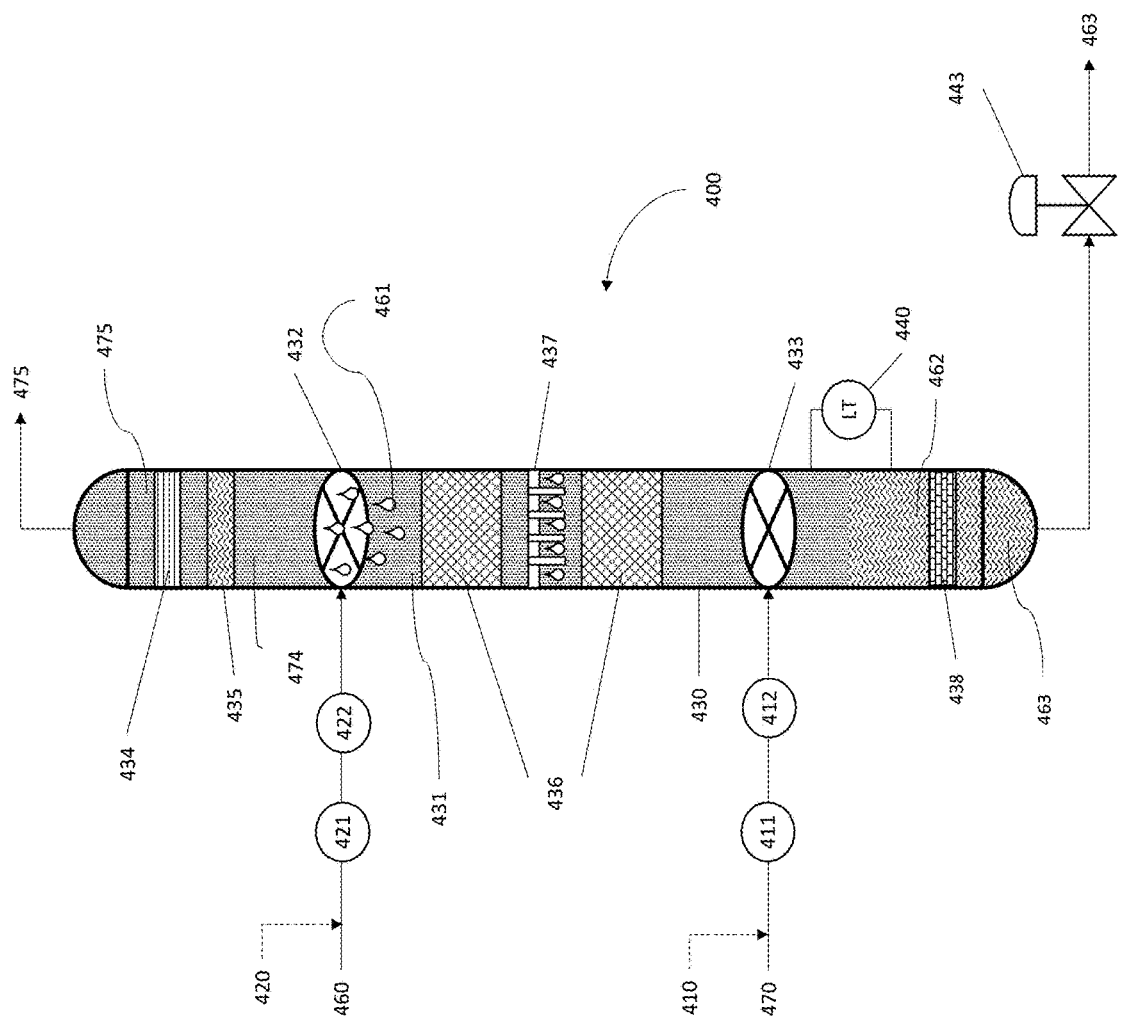
FIG. 4 illustrates a schematic view of a system including a separation vessel according to an embodiment of the disclosure.

Referring to FIG. 4, another embodiment of a system 400 for crude oil desalting and dehydration is disclosed, where the additional elements shown in FIG. 4 may each be optional additions to the system 300 of FIG. 3. As disclosed with respect to FIG. 3 the system 400 can comprise a separation vessel 430 defining a cavity 431 generally extending along a central axis that extends vertically or substantially vertically, for example, such that the cavity 431 has a vertical or substantially vertical orientation. The separation vessel 430 also comprises one or more components as similarly disclosed with respect to FIG. 1, particularly, a distributor 433 disposed, a distributor 432, and an interface level control valve 443, where similar elements can be the same as or similar to those described with respect to FIGS. 1-3

Additionally or alternatively, in the embodiment of FIG. 4, the separation vessel 430 may also comprise one or more components as similarly disclosed with respect to FIG. 2, particularly, packing 436, a liquid redistribution tray 437, a mechanical coalescer 435, a mechanical coalescer 438, a wash fluid treatment 420, a wash fluid mixer 421, a crude oil treatment 410, a mixture mixer 411, an electrostatic grid assembly 434.

Additionally or alternatively, in the embodiment of FIG. 4, and as similarly disclosed with respect to FIG. 2, the system 400 may further comprise a mixture heat exchanger 412 and a wash fluid heat exchanger 422.

Additionally or alternatively, in the embodiment of FIG. 4, and as similarly disclosed with respect to FIG. 3, the separation vessel 430 may be configured to maintain the crude oil as a continuous phase and to maintain the wash fluid as a dispersed phase within the cavity 431. For example, in the embodiment of FIG. 4, the separation vessel 430 can include an interface level controller 440 configured as disclosed with respect to FIG. 3.

As similarly discussed with respect to FIG. 2, in the embodiment of FIG. 4, in operation, one or more chemicals may be introduced into a mixture 470, for example, from the crude oil treatment 410, and mixed with the mixture 470, for example, via the mixture mixer 411, to enhance the separability of the crude oil and the water and/or contaminants within the mixture 470. Additionally, in the embodiment of FIG. 4, the mixture 470 may be heated or cooled via the operation of the mixture heat exchanger 412. Likewise, one or more chemicals may be introduced into a wash fluid 460, for example, from the wash fluid treatment 420, and mixed with the wash fluid 460, for example, via the wash fluid mixer 421, to enhance to capability of the wash water to separate the crude oil and the water and/or contaminants within the mixture 470. Additionally, in the embodiment of FIG. 4, the wash fluid 460 may be heated or cooled via the operation of the wash fluid heat exchanger 422.

As similarly discussed with respect to FIG. 3, in the embodiment of FIG. 4 the mixture 470 is introduced into the cavity 431 of the separation vessel 430 via the distributor 433. Likewise, the wash fluid 460 is introduced into the cavity 431 of the separation vessel 430 via the distributor 432. The wash fluid 460 may enter the cavity 431 as an aqueous fluid, for example, substantially free of solutes such as salts. The distributor 432 evenly distributes the wash fluid 460 across a cross-sectional area of the cavity 431, for example, forming wash fluid droplets 461.

Upon entering the cavity 431, the wash fluid droplets 461 contain relatively low levels of dissolved salts. The difference in density between the wash fluid droplets 461 and the mixture 470 within the cavity 431 can cause the wash fluid droplets 461 to travel downwards within the cavity 431. As the wash fluid droplets 461 travel downward through the cavity 431, the contaminants within the continuous phase formed by the crude oil 470 can transfer into the wash fluid droplets 461 at the interface between the two phases. As the wash fluid droplets 461 travel downwards, they interact with the mixture 470, including with the water and/or contaminants within the mixture 470. For example, the water and/or contaminants within the mixture 470 may coalesce with the wash fluid droplets 461, forming larger and saltier water droplets, thus reducing the water content and salinity of the mixture 470.

The interaction between the wash fluid droplets 461 and the continuous phase formed by the mixture 470 can be enhanced by using one or more sections of the packing 436. Where multiple sections of packing 436 are utilized, the liquid redistribution tray 437 may be effective to redistribute the droplets 461 across the cross-sectional area of the cavity 431 between the sections of packing.

As the mixture 470 approaches the top of the cavity 431, the mixture 470 may comprise, alternatively, consist essentially of, alternatively consist of oil. As the mixture 470 continues to rise through the cavity 431, water and salt can be stripped away from the mixture 470, 431 forming the product oil 475. The mechanical coalescer 435 may be disposed within the cavity 431 near, for example, the pre-coalesced liquid 474, and may be used to enhance coalescence of the pre-coalesced liquid 474.

In some embodiments, the crude oil may still contain unacceptable levels of water and/or salt. In the embodiment of FIG. 4, the electrostatic grid assembly 434 can be configured to create a voltage potential effective to electrostatically coalesce any water within the pre-coalesced liquid 474 into droplets, for example, such that the coalesced water droplets can be separated from the pre-coalesced liquid 474 to form the product oil 475.

As similarly disclosed with respect to FIG. 3, as water and/or salts from the mixture 470 are coalesced into the wash fluid droplets 461, the salinity of the wash fluid droplets 461 may increase as it approaches the lower portion of cavity 431. For example, as the wash fluid droplets 461 reach the lower portion of the cavity 431, the wash fluid droplets 461 may be characterized as a high-salinity wash fluid, for example, the pre-coalesced brine 462. As droplets of the brine 461 approach the bottom of the cavity 431, the droplets of the brine 461 pass through the interface between the continuous phase crude oil and the pre-coalesced brine 462, for example, coalescing into pre-coalesced brine 462 phase near the bottom of the cavity 431.

In the embodiment of FIG. 4, any oil present within the pre-coalesced brine 462 may be coalesced via the mechanical coalescer 438, for example, to form larger oil droplets, which are able to rise against the downward velocity of the brine 463 more readily than smaller droplets.

The level of the interface between the continuous phase crude oil and the brine 463 can be measured via the interface level controller 440 and may be controlled by controlling the removal of the brine 463 from the bottom of the cavity 431. As the wash fluid droplets 461 travel downwards through the cavity 431, the wash fluid can increase in salinity to form the brine 463, which can be removed, for example, under the control of the interface level controller 440, via the interface level control valve 443, to maintain the interface between the continuous phase of the crude oil and the brine 463 within a desired range and/or at a desired level.

Figure 5:
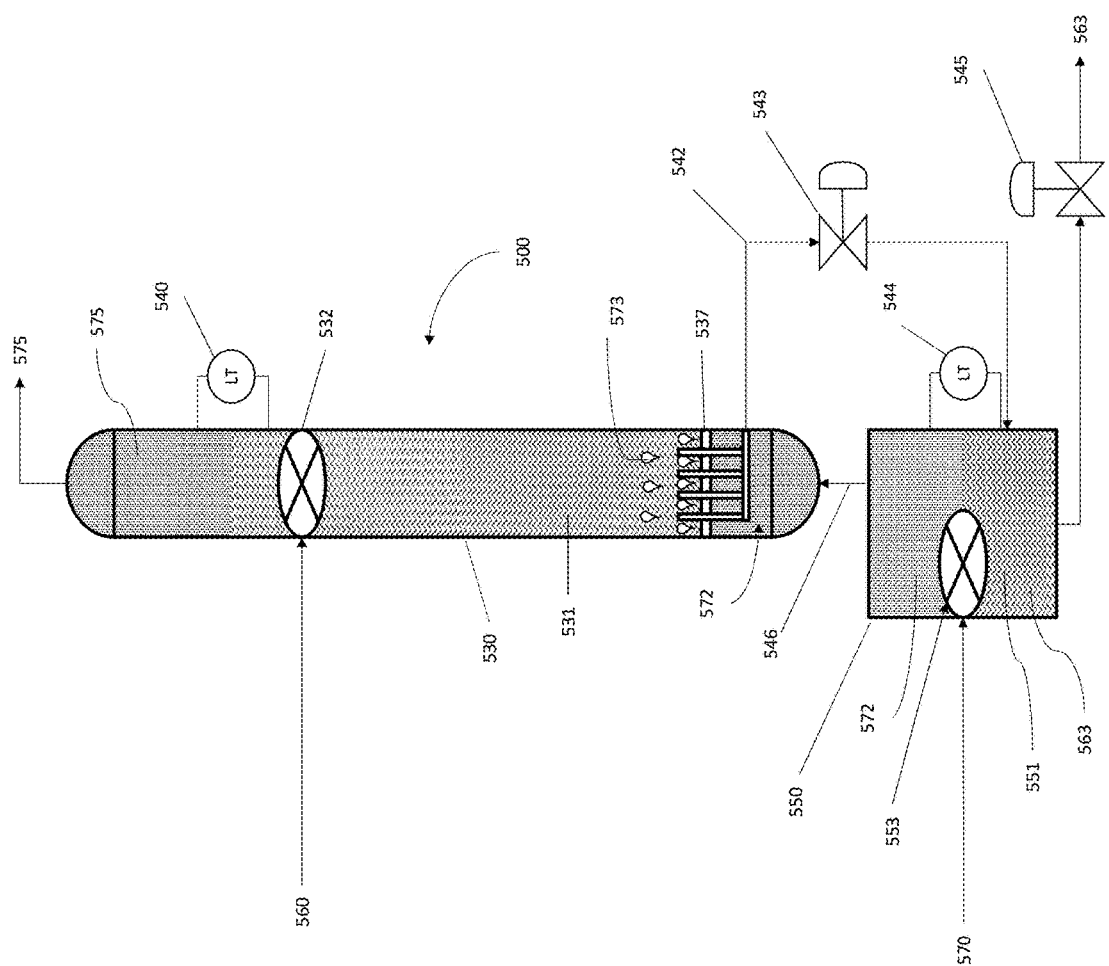
FIG. 5 illustrates a schematic view of a system including a separation vessel according to an embodiment of the disclosure.

Referring to FIG. 5, another embodiment of a system 500 for crude oil desalting and dehydration is disclosed. The system 500 can comprise a preliminary separation vessel 550 defining a cavity 551 and a secondary separation vessel 530 defining a cavity 531 generally extending along a central axis that extends vertically or substantially vertically, for example, such that the cavity 531 has a vertical or substantially vertical orientation. The secondary separation vessel 530 also comprises one or more components as similarly disclosed with respect to FIG. 1, particularly, a distributor 532 disposed, and an interface level controller 540. Also, in the embodiment of FIG. 5, the preliminary separation vessel 550 can comprise a distributor 553, as similarly disclosed with respect to FIG. 1, and a interface level controller 544 and a interface level control valve 545.

In the embodiment of FIG. 5, system 500 and the secondary separation vessel 530 are configured to receive crude oil, as will be disclosed herein, from the preliminary separation vessel 550. Also in the embodiment of FIG. 5, the system 500 and the preliminary separation vessel 550 are configured to receive a wash fluid, for example, a brine, from the secondary separation vessel 530. For example, in the embodiment of FIG. 5, the secondary separation vessel 530 comprises a liquid distribution tray 537 disposed in a lower portion of the cavity 531. The liquid distribution tray 537 can be configured to redistribute liquids across the cross-sectional area of the cavity 531. Also in the embodiment of FIG. 5, the liquid distribution tray 537 may be configured to collect a wash fluid, for example, a brine. The system 500 also comprises a brine transfer valve 543 and brine transfer conduit 542 configured to transfer the brine to the preliminary separation vessel 550 and, additionally, an oil transfer conduit 546 configured to transfer separated raw liquid 572 from the preliminary separation vessel 550 to the secondary separation vessel 530.

In the embodiment of FIG. 5, in operation, a mixture 570 is introduced into the preliminary separation vessel 550 via the distributor 553. The distributor 553 evenly distributes the mixture 570 across a cross-sectional area of the preliminary separation vessel 550. The preliminary separation vessel 550 may also include a brine 563 which, as will be disclosed herein, is received from the secondary separation vessel 530.

With sufficient residence time, the difference in density between the oil and water phases present within the preliminary separation vessel 550 may cause the oil and aqueous fluids to separate into two distinct phases, for example, such that at least a portion of any water and/or salts within the mixture 570 coalesces into the brine 563. The brine 563 is removed from the preliminary separation vessel 550 via the operation of the interface level controller 544 and the interface level control valve 545 to maintain the oil/water interface in the preliminary separation vessel 550.

At least a portion of the separated raw liquid 572 within the preliminary separation vessel 550 can be transferred via the oil transfer conduit 546 and enters the bottom of the secondary separation vessel 530. The liquid distribution tray 537 can evenly distribute the oil across the cross-section of the secondary separation vessel 530, forming droplets 573 at the same time. The droplets 573 may comprise, primarily, oil with small amounts of produced water suspended within the droplets 573, for example, as an emulsion.

The wash fluid 560 can be introduced into the cavity 531 of the secondary separation vessel 530 via the distributor 532. The wash fluid 560 may enter the cavity 531 as an aqueous fluid, for example, substantially free of solutes such as salts. As water and/or salts from the mixture 570 are coalesced into the wash fluid 560, as disclosed herein, the salinity of the wash fluid 560 may increase, for example, to form the brine 563.

The droplets 573 in the lower portion of the cavity 531 are surrounded by the brine 563. The difference in density between the droplets 573 and the brine 563 causes the droplets 573 to travel upwards through the continuous phase (the brine 563 or wash fluid 560) within cavity 531. As the droplets 573 travel upwards, they interact with the brine 563 and/or the wash fluid 560. For example, when the water contained in the droplets 573 reaches the surface of a droplet 573, it contacts the continuous phase (the brine 563 and/or wash fluid 560) and coalesces into the surrounding continuous phase, thus reducing the water content and salinity of the droplets 573.

As the droplets 573 approach the top of the cavity 531, the droplets 573 comprise, alternatively, consist essentially of, alternatively consist of oil. As the droplets 573 continue to rise through the cavity 531, the droplets 573 pass through the interface between the continuous phase wash fluid and the crude oil, for example, coalescing into an oil phase near the top of the cavity 531, for example, forming the product oil 575.

The level of the interface between the continuous phase wash fluid and the crude oil is measured via the interface level controller 540 and may be controlled by controlling the removal of the brine 563 from the bottom of the cavity 531. As similarly discussed with respect to FIG. 1, the wash fluid 560 travels downwards through the cavity 531, it increases in salinity to form the brine 563, for example, as water and salts from the droplets 573 coalesce into the wash fluid 560.

After passing below the liquid distribution tray 537, the brine 563 can be removed from the secondary separation vessel 530 through the brine transfer conduit 542, for example, under the control of the interface level controller 540, via the brine transfer valve 543, to maintain the interface between the continuous phase wash fluid and the crude oil within a desired range and/or at a desired level.

Figure 6:
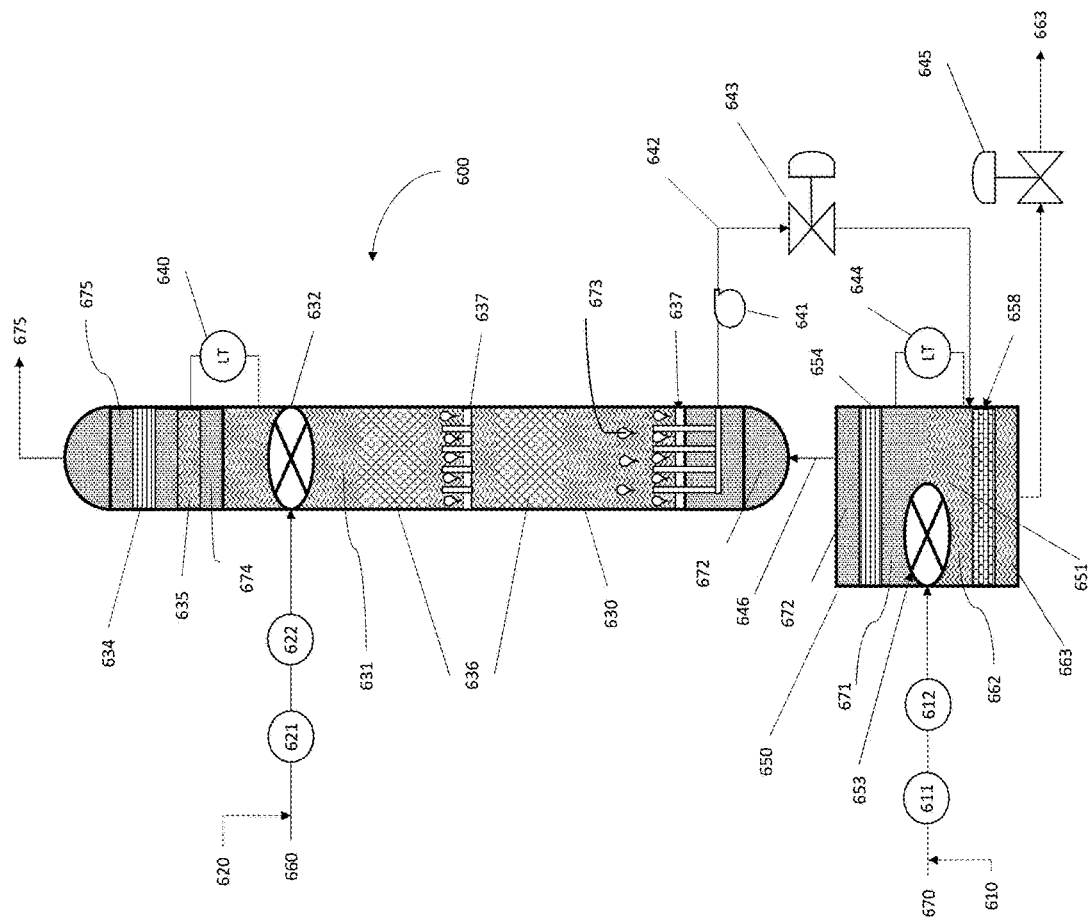
FIG. 6 illustrates a schematic view of a system including a separation vessel according to an embodiment of the disclosure.

Referring to FIG. 6, another embodiment of a system 600 for crude oil desalting and dehydration is disclosed, where the additional elements shown in FIG. 6 may each be optional additions to the system 500 of FIG. 5. The system 600 also comprises a preliminary separation vessel 650 defining a cavity 651 and a secondary separation vessel 630 defining a cavity 631 generally extending along a central axis that extends vertically or substantially vertically, for example, such that the cavity 631 has a vertical or substantially vertical orientation. The secondary separation vessel 630 also comprises one or more components as similarly disclosed with respect to FIGS. 1 and 2, particularly, a distributor 632, an interface level controller 640, packing 636, a liquid redistribution tray 637, a mechanical coalescer 635, a wash fluid treatment 620, a wash fluid mixer 621, and an electrostatic grid assembly 634, where similar elements can be the same as or similar to those described with respect to FIGS. 1-5.

In the embodiment of FIG. 6, the preliminary separation vessel 650 may comprise a distributor 653, as similarly disclosed with respect to FIG. 1. Also, in the embodiment of FIG. 6, the preliminary separation vessel 650 may comprise a electrostatic grid assembly 654, which is configured as similarly disclosed with respect to electrostatic grid assembly 234 disclosed with respect to FIG. 2. Also, in the embodiment of FIG. 6, the system 600 and the secondary separation vessel 630 may comprise a liquid distribution tray 637 disposed in a lower portion of the cavity 631, as similarly disclosed with respect to FIG. 5. The system 600 may also comprises a brine transfer pump 641, brine transfer valve 643, brine transfer conduit 642, and oil transfer conduit 646, as similarly disclosed with respect to FIG. 5.

In the embodiment of FIG. 6, in operation, one or more chemicals may be introduced into the mixture 670, for example, from the crude oil treatment 610, and mixed with the mixture 670, for example, via the mixture mixer 611, to enhance the separability of the crude oil and the water and/or contaminants within the mixture 670. Additionally, in the embodiment of FIG. 6, the mixture 670 may be heated or cooled via the operation of the mixture heat exchanger 612.

Also, in the embodiment of FIG. 6, one or more chemicals may be introduced into the wash fluid 660, for example, from the wash fluid treatment 620, and mixed with the wash fluid 660, for example, via the wash fluid mixer 621, to enhance to capability of the wash water to separate the crude oil and the water and/or contaminants within the mixture 670. Additionally, in the embodiment of FIG. 6, the wash fluid 660 may be heated or cooled via the operation of the wash fluid heat exchanger 622.

In the embodiment of FIG. 6, the mixture 670 can be introduced into the preliminary separation vessel 650 via the liquid distributor 653, which distributes the mixture 670 across a cross-sectional area of the preliminary separation vessel 650. The preliminary separation vessel 650 may also include a brine 662 which, as will be disclosed herein, is received from the secondary separation vessel 630.

With sufficient residence time, the difference in density between the oil and water phases present within the preliminary separation vessel 650 may cause the oil and aqueous fluids to separate into two distinct phases, for example, such that at least a portion of any water and/or salts within the mixture 670 coalesces into the brine 662. Any oil droplets that remain in the brine 662 may be coalesced across an optional mechanical coalescer 658, for example, to form larger oil droplets, which are able to rise against the downward velocity of the brine 663 more readily than smaller droplets. The brine 663 can be removed from the preliminary separation vessel 650 via the operation of the interface level controller 644 and the interface level control valve 645 to maintain the oil/water interface in the preliminary separation vessel 650.

In the embodiment of FIG. 6, the electrostatic grid assembly 654 can be configured to create a voltage potential effective to electrostatically coalesce any water within the pre-separated raw liquid 671 into larger droplets, for example, such that the coalesced water droplets can be separated from the pre-separated raw liquid 671 within the preliminary separation vessel 650 to form separated raw liquid 672.

At least a portion of the separated raw liquid 672 within the preliminary separation vessel 650 can be transferred, via the oil transfer conduit 646 and enter the bottom of the secondary separation vessel 630. The liquid distribution tray 637 evenly distributes the oil across the cross-section of the secondary separation vessel 630, forming droplets 673 at the same time. The droplets 673 may comprise, primarily, oil with small amounts of produced water suspended within the droplets 673, for example, as an emulsion.

The wash fluid 660 can be introduced into the cavity 631 of the secondary separation vessel 630 via the distributor 632. The wash fluid 660 may enter the cavity 631 as an aqueous fluid, for example, substantially free of solutes such as salts. As water and/or salts from the droplets 673 are coalesced into the wash fluid 660, as disclosed herein, the salinity of the wash fluid 660 may increase, for example, to form the brine 662.

The droplets 673 in the lower portion of the cavity 631 are surrounded by the brine 662. The difference in density between the droplets 673 and the brine 662 causes the droplets 673 to travel upwards through the continuous phase 662 within cavity 631. As the droplets 673 travel upwards, they interact with the brine 662 and/or the wash fluid 660. For example, when the water contained in the droplets 673 reaches the surface of a droplet 673, it contacts the continuous phase 662 and coalesces into the surrounding continuous phase, thus reducing the water content and salinity of the droplets 673.

The interaction between the droplets 673 and the continuous phase 662 can be enhanced by using one or more sections of the packing 636. Where multiple sections of packing 636 are utilized, the liquid redistribution tray 637 may be effective to redistribute the droplets 673 across the cross-sectional area of the cavity 631.

As the droplets 673 approach the top of the cavity 631, the droplets 673 comprise, alternatively, consist essentially of, alternatively, consist of oil. As the droplets 673 continue to rise through the cavity 631, the droplets 673 pass through the interface between the continuous phase wash fluid and the pre-coalesced liquid 674, for example, coalescing into the pre-coalesced liquid 674 near the top of the cavity 631. The mechanical coalescer 635 is disposed within the cavity 631 near, for example, above, the interface between the continuous phase wash fluid and the pre-coalesced liquid, and may be used to enhance coalescence of the droplets 673.

In some embodiments, the crude oil may still contain unacceptable levels of water and/or salt. In the embodiment of FIG. 6, the electrostatic grid assembly 634 can be configured to create a voltage potential effective to electrostatically coalesce any water within the pre-coalesced liquid 674 into droplets, for example, such that the coalesced water droplets can be separated from the pre-coalesced liquid 674 to form the product oil 675.

The level of the interface between the continuous phase wash fluid and the crude oil is measured via the interface level controller 640 and may be controlled by controlling the removal of the brine 662 from the bottom of the cavity 631. As the wash fluid 660 travels downwards through the cavity 631, it increases in salinity to form the brine 662, for example, as water and salts from the droplets 673 coalesce into the wash fluid 660.

After passing through the liquid distribution tray 637, the brine 662 can be removed from the secondary separation vessel 630 through the brine transfer conduit 642, for example, under the control of the interface level controller 640, via the brine transfer pump 641, and brine transfer valve 643, to maintain the interface between the continuous phase wash fluid and the crude oil within a desired range and/or at a desired level.

Figure 7:
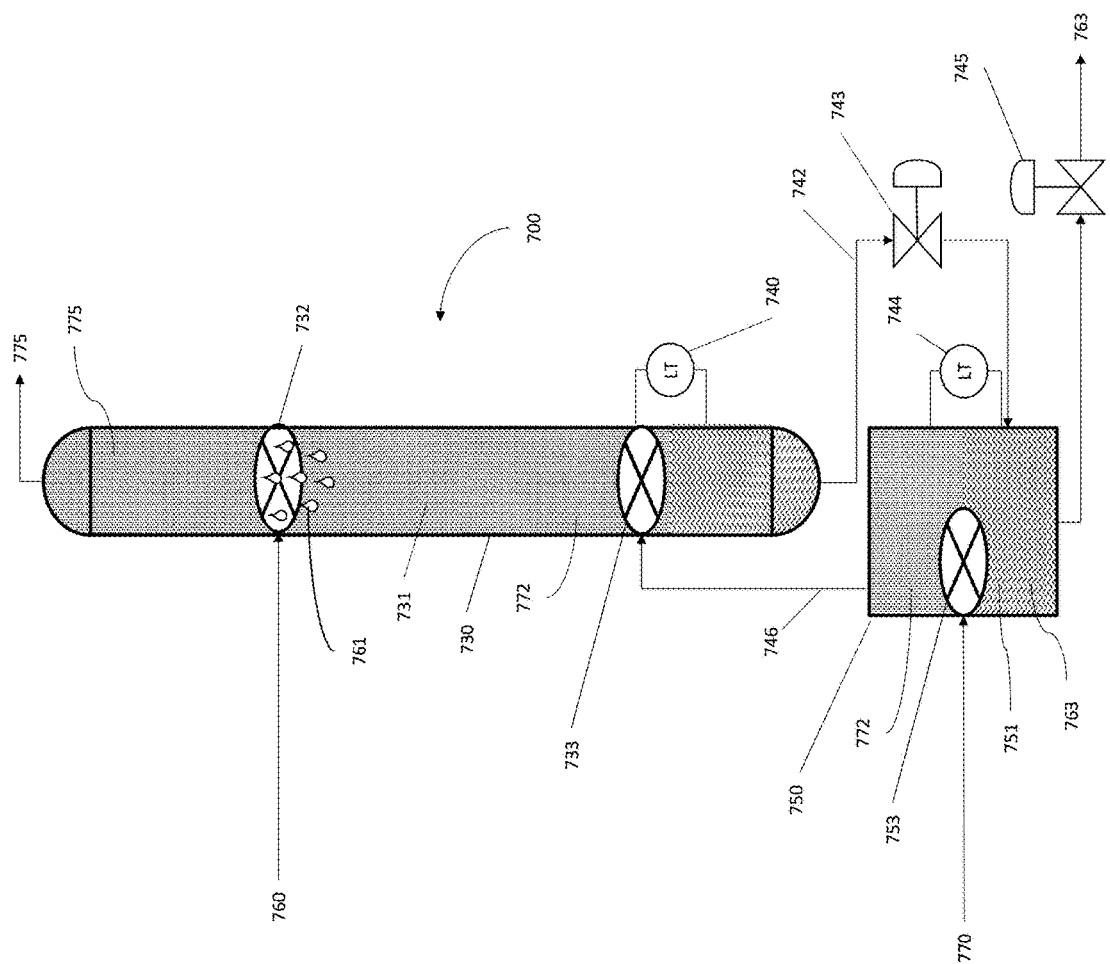
FIG. 7 illustrates a schematic view of a system including a separation vessel according to an embodiment of the disclosure.

Referring to FIG. 7, another embodiment of a system 700 for crude oil desalting and dehydration is disclosed. As similarly disclosed with respect to FIG. 5, the system 700 comprises a preliminary separation vessel 750 defining a cavity 751 and a secondary separation vessel 730 defining a cavity 731 generally extending along a central axis that extends vertically or substantially vertically, for example, such that the cavity 731 has a vertical or substantially vertical orientation. The secondary separation vessel 730 can also comprises one or more components as similarly disclosed with respect to FIG. 1, particularly, a distributor 732 and a distributor 733. Also, in the embodiment of FIG. 7, the preliminary separation vessel 750 comprises a distributor 753, as similarly disclosed with respect to FIG. 1, and a interface level controller 744 and a interface level control valve 745, where similar elements can be the same as or similar to those described with respect to FIGS. 1-6.

In the embodiment of FIG. 7, the secondary separation vessel 730 can be configured to maintain the crude oil as a continuous phase and to maintain the wash fluid as a dispersed phase within the cavity 731. For example, in the embodiment of FIG. 7, the secondary separation vessel 730 includes an interface level controller 740. The interface level controller 740 may be configured to detect an interface between the continuous phase wash fluid and the crude oil. In the embodiment of FIG. 7, the interface level controller 740 can be configured to maintain the interface between the continuous phase wash fluid and the crude oil within a predetermined range, for example, at a predetermined level within the cavity 731. For example, the interface level controller 740 may maintain the interface level by controlling the operation of an interface level control valve 743, which is configured to allow a fluid to be withdrawn from a lower portion of the cavity 731 via brine transfer line 742.

In the embodiment of FIG. 7, in operation, a mixture 770 can be introduced into the preliminary separation vessel 750 via the distributor 753. The distributor 753 evenly distributes the mixture 770 across a cross-sectional area of the preliminary separation vessel 750. The preliminary separation vessel 750 may also include a brine 763 which, as will be disclosed herein, is received from the secondary separation vessel 730.

With sufficient residence time, the difference in density between the oil and water phases present within the preliminary separation vessel 750 may cause the oil and aqueous fluids to separate into two distinct phases, for example, such that at least a portion of any water and/or salts within the mixture 770 coalesces into the brine 763. The brine 763 can be removed from the preliminary separation vessel 750 via the operation of the interface level controller 744 and the interface level control valve 745 to maintain the oil/water interface in the preliminary separation vessel 750.

At least a portion of the separated raw liquid 772 within the preliminary separation vessel 750 is transferred, via the oil transfer conduit 746 and enters a lower portion of the secondary separation vessel 730 via the distributor 733. Likewise, the wash fluid 760 is introduced into the cavity 731 of the secondary separation vessel 730 via the distributor 732. The wash fluid 760 may enter the cavity 731 as an aqueous fluid. As water and/or salts from the mixture 770 are coalesced into the wash fluid 760, as disclosed herein, the salinity of the wash fluid 760 may increase, for example, to form the brine 763. The distributor 732 evenly distributes the wash fluid 760 across a cross-sectional area of the cavity 731, for example, forming wash fluid droplets 761.

Upon entering the cavity 731, the wash fluid droplets 761 can contain lower levels of dissolved salts than the wash fluid leaving the cavity 731. The difference in density between the wash fluid droplets 761 and the mixture 770 within the cavity 731 causes the wash fluid droplets 761 to travel downwards within the cavity 731. As the wash fluid droplets 761 travel downward through the cavity 731, they encounter pockets of water and/or contaminants within the continuous phase formed by the mixture 770 within the cavity 731. As the wash fluid droplets 761 travel downwards, they interact with the mixture 770, particularly, with the water and/or contaminants within the mixture 770. For example, the water and/or contaminants within the mixture 770 may coalesce with the wash fluid droplets 761, forming larger and saltier water droplets, thus reducing the water content and salinity of the mixture 770 in the upper portions of cavity 731.

As the mixture 770 approaches the top of the cavity 731, the mixture 770 may comprise, alternatively, consist essentially of, alternatively consist of oil. As the mixture 770 continues to rise through the cavity 731, the mixture 770 forms a desalter and dehydrated oil phase near the top of the cavity 731, for example, forming the product oil 775.

As water and/or salts from the mixture 770 are coalesced into the wash fluid droplets 761, the salinity of the wash fluid droplets 761 may increase as it approaches the lower portion of the cavity 731. For example, as the wash fluid droplets 761 reach the lower portion of the cavity 731, the wash fluid droplets 761 may be characterized as a high-salinity wash fluid, for example, the brine 763. As droplets of the brine 763 approach the bottom of the cavity 731, the droplets of the brine 763 pass through the interface between the continuous phase crude oil and the brine 763, for example, coalescing into brine 763 phase near the bottom of the cavity 731.

The level of the interface between the continuous phase crude oil and the wash fluid can be measured via the interface level controller 740 and may be controlled by controlling the removal of the brine 763 from the bottom of the cavity 731. As similarly discussed with respect to FIG. 1, as the wash fluid 760 travels downwards through the cavity 731, it increases in salinity to form the brine 763, for example, as water and salts from the separated raw liquid 772 coalesce with the wash fluid droplets 761.

Upon reaching the bottom of the cavity 731, the brine 763 can be removed from the secondary separation vessel through the brine transfer conduit, for example, under the control of the interface level controller 740, via the brine transfer valve 743, to maintain the interface between the continuous phase crude oil and the wash fluid within a desired range and/or at a desired level.

Figure 8:
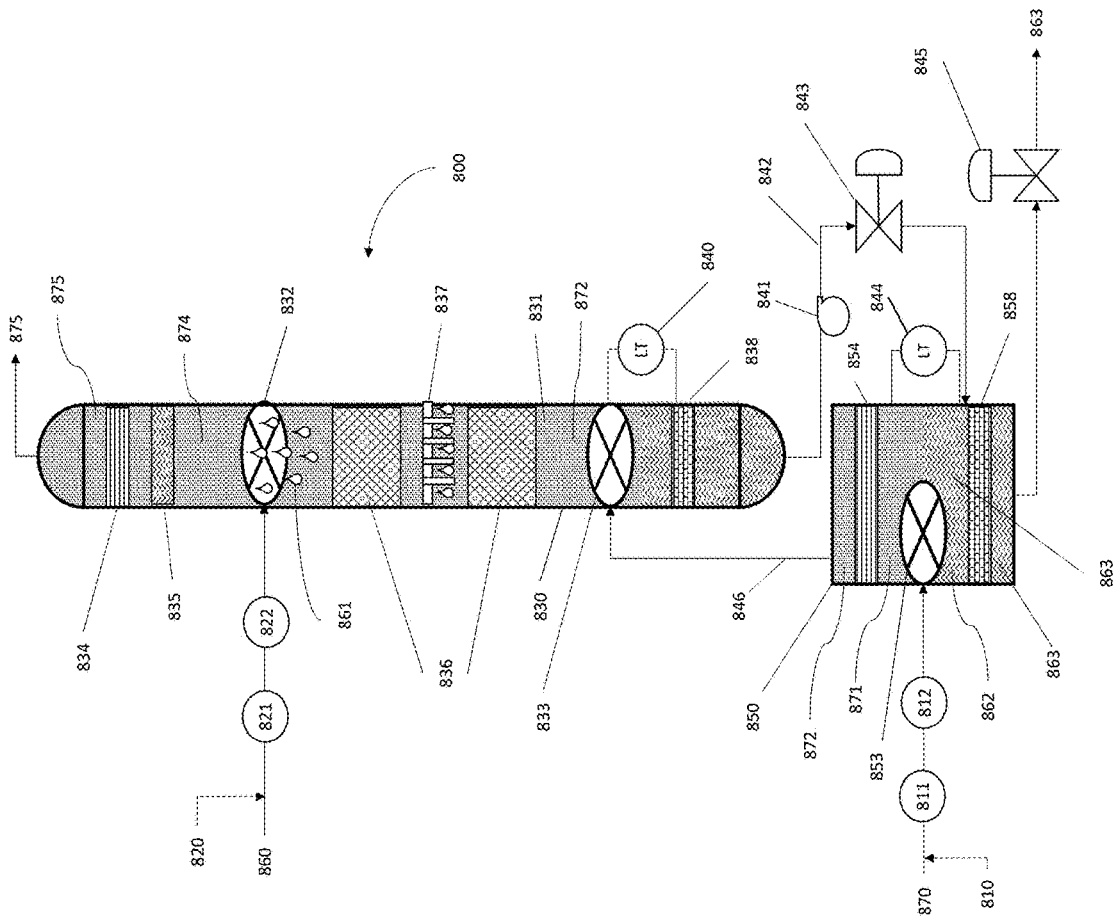
FIG. 8 illustrates a schematic view of a system including a separation vessel according to an embodiment of the disclosure.

Referring to FIG. 8, another embodiment of a system 800 for crude oil desalting and dehydration is disclosed, where the additional elements shown in FIG. 8 may each be optional additions to the system 700 of FIG. 7. As similarly disclosed with respect to FIG. 7, the system 800 comprises a preliminary separation vessel 850 defining a cavity 851 and a secondary separation vessel 830 defining a cavity 831 generally extending along a central axis that extends vertically or substantially vertically, for example, such that the cavity 831 has a vertical or substantially vertical orientation. The secondary separation vessel 830 also comprises one or more components as similarly disclosed with respect to FIGS. 1 and 2, particularly, a distributor 832, a distributor 833, an interface level controller 840, packing 836, a liquid redistribution tray 837, a mechanical coalescer 835, a mechanical coalescer 838, a wash fluid treatment 820, a wash fluid mixer 821, and an electrostatic grid assembly 834, where similar elements can be the same as or similar to those described with respect to FIGS. 1-7.

In the embodiment of FIG. 8, the preliminary separation vessel 850 comprises a distributor 853, as similarly disclosed with respect to FIG. 1. Also, in the embodiment of FIG. 8, the preliminary separation vessel 850 comprises a electrostatic grid assembly 854, as similarly disclosed with respect to FIG. 6, and a mechanical coalescer 858. Also, in the embodiment of FIG. 8, the system 800 also comprises a brine transfer pump 841, brine transfer conduit 842, brine transfer valve 843, and oil transfer conduit 846, as similarly disclosed with respect to FIG. 5.

In the embodiment of FIG. 8, in operation, one or more chemicals may be introduced into the mixture 870, for example, from the crude oil treatment 810, and mixed with the mixture 870, for example, via the mixture mixer 811, to enhance the separability of the crude oil and the water and/or contaminants within the mixture 870. Additionally, in the embodiment of FIG. 8, the mixture 870 may be heated or cooled via the operation of the mixture heat exchanger 812.

Also, in the embodiment of FIG. 8, one or more chemicals may be introduced into the wash fluid 860, for example, from the wash fluid treatment 820, and mixed with the wash fluid 860, for example, via the wash fluid mixer 821, to enhance to capability of the wash water to separate the crude oil and the water and/or contaminants within the mixture 870. Additionally, in the embodiment of FIG. 8, the wash fluid 860 may be heated or cooled via the operation of the wash fluid heat exchanger 822.

In the embodiment of FIG. 8, the mixture 870 can be introduced into the preliminary separation vessel 850 via the distributor 853, which distributes the mixture 870 across a cross-sectional area of the preliminary separation vessel 850. The preliminary separation vessel 850 may also include a brine 862 which, as will be disclosed herein, is received from the secondary separation vessel 830.

With sufficient residence time, the difference in density between the oil and water phases present within the preliminary separation vessel 850 may cause the oil and aqueous fluids to separate into two distinct phases, for example, such that at least a portion of any water and/or salts within the mixture 870 coalesces into the precoalesced brine 862. Any oil droplets that remain in the precoalesced brine 862 may be coalesced across an optional mechanical coalescer 858, for example, to form larger oil droplets, which are able to rise against the downward velocity of the brine 863 more readily than smaller droplets. The brine 863 is removed from the preliminary separation vessel 850 via the operation of the interface level controller 844 and the interface level control valve 845 to maintain the oil/water interface in the preliminary separation vessel 850.

In the embodiment of FIG. 8, the electrostatic grid assembly 854 can be configured to create a voltage potential effective to electrostatically coalesce any water within the pre-separated raw liquid 871 into droplets, for example, such that the coalesced water droplets can be separated from the pre-separated raw liquid 871 within the preliminary separation vessel 850.

At least a portion of the separated raw liquid 872 within the preliminary separation vessel 850 is transferred, via the oil transfer conduit 846 and enters a lower portion of the secondary separation vessel 830 via the distributor 833. Likewise, the wash fluid 860 is introduced into the cavity 831 of the secondary separation vessel 830 via the distributor 832. The wash fluid 860 may enter the cavity 831 as an aqueous fluid, for example, substantially free of solutes such as salts. As water and/or salts from the mixture 870 are coalesced into the wash fluid 860, as disclosed herein, the salinity of the wash fluid 860 may increase, for example, to form the brine 862. The distributor 832 evenly distributes the wash fluid 860 across a cross-sectional area of the cavity 831, for example, forming wash fluid droplets 861.

Upon entering the cavity 831, the wash fluid droplets 861 can contain relatively low levels of dissolved salts with respect to the wash fluid leaving the cavity 831. The difference in density between the wash fluid droplets 861 and the mixture 870 within the cavity 831 causes the wash fluid droplets 861 to travel downwards within the cavity 831. As the wash fluid droplets 861 travel downward through the cavity 831, the water and/or contaminants within the continuous phase formed by the mixture 870 within the cavity 831 can transfer to the droplets 861. As the wash fluid droplets 861 travel downwards, they interact with the mixture 870, particularly, with the water and/or contaminants within the mixture 870. For example, the water and/or contaminants within the mixture 870 may coalesce with the wash fluid droplets 861, forming larger and saltier water droplets, thus reducing the water content and salinity of the mixture 870 in the upper portions of cavity 831.

The interaction between the wash fluid droplets 861 and the continuous phase formed by the mixture 870 is enhanced by using one or more sections of the packing 836. Where multiple sections of packing 836 are utilized, the liquid redistribution tray 837 may be effective to redistribute across the cross-sectional area of the cavity 831.

As the mixture 870 approaches the top of the cavity 831, the mixture 870 may comprise, alternatively, consist essentially of, alternatively, consist of oil. As the mixture 870 continues to rise through the cavity 831, the mixture 870 forms a desalted and dehydrated oil phase near the top of the cavity 831, for example, forming the precoalesced liquid 874.

In some embodiments, the precoalesced liquid 874 may still contain unacceptable levels of water and/or salt. In the embodiment of FIG. 8, the mechanical coalescer 835 can be installed within the cavity 831 to enhance the coalescence of any remaining water droplets in the precoalesced liquid 874. Additionally or alternatively, the electrostatic grid assembly 834 can be configured to create a voltage potential effective to electrostatically coalesce any water within the precoalesced liquid 874 into droplets, for example, such that the coalesced brine droplets can be separated from the precoalesced liquid 874 to form the product oil 875.

As water and/or salts from the separated raw liquid 872 are coalesced into the wash fluid droplets 861, the salinity of the wash fluid droplets 861 may increase as it approaches the lower portion of cavity 831. For example, as the wash fluid droplets 861 reach the lower portion of the cavity 831, the wash fluid droplets 861 may be characterized as a high-salinity wash fluid, for example, the brine 862. As droplets of the brine 862 approach the bottom of the cavity 831, the droplets of the brine 862 pass through the interface between the continuous phase crude oil and the brine 862, for example, coalescing into brine 862 phase near the bottom of the cavity 831.

In the embodiment of FIG. 8, any oil present within the brine 862 may be coalesced via the mechanical coalescer 858, for example, to form larger oil droplets, which are able to rise against the downward velocity of the brine 863 more readily than smaller droplets.

The level of the interface between the continuous phase crude oil and the wash fluid is measured via the interface level controller 840 and may be controlled by controlling the removal of the brine 862 from the bottom of the cavity 831. As similarly discussed with respect to FIG. 1, the wash fluid 860 travels downwards through the cavity 831, it increases in salinity to form the brine 862, for example, as water and salts from the separated raw liquid 872 coalesce into the wash fluid 860.

Upon reaching the bottom of the cavity 831, the brine 862 can be removed from the secondary separation vessel 830 through the brine transfer conduit 842, for example, under the control of the interface level controller 840, via the brine transfer pump 841 and brine transfer valve 843, to maintain the interface between the continuous phase crude oil and the wash fluid within a desired range and/or at a desired level.

Having described various devices, systems, and methods, some aspects can include, but are not limited to:

In a first aspect, a system for crude oil desalting and dehydration comprises: a separation vessel defining a cavity extending along a central axis, the central axis having a substantially-vertical orientation, the separation vessel comprising: a first distributor configured to distribute a mixture within the cavity of the separation vessel, wherein the mixture comprises crude oil, water, dissolved salts, free salts, or combinations thereof; a second distributor configured to distribute a wash fluid within the cavity of the separation vessel, wherein the wash fluid comprises an aqueous fluid, and wherein the first distributor is disposed within the cavity below the second distributor; and an interface level controller configured to detect an interface between an oil phase and an aqueous phase and to maintain the interface within a predetermined range within the cavity.

A second aspect can include the system of the first aspect, wherein the interface level is configured to maintain the wash fluid as a continuous phase in the cavity and to maintain the mixture as a dispersed phase within the continuous phase in the cavity.

A third aspect can include the system of the second aspect, wherein the predetermined range within the cavity is above the second distributor.

A fourth aspect can include the system of the first aspect, 4. wherein the interface level is configured to maintain the mixture as a continuous phase in the cavity and to maintain the wash fluid as a dispersed phase within the continuous phase in the cavity.

A fifth aspect can include the system of the fourth aspect, wherein the predetermined range within the cavity is below the first distributor.

A sixth aspect can include the system of any one of the first to fifth aspects, wherein the separation vessel further comprises random or structured packing disposed within the cavity.

A seventh aspect can include the system of any one of the first to sixth aspects, wherein the separation vessel further comprises a first mechanical coalescer configured to enhance coalescence of water droplets within the oil phase, a second mechanical coalescer configured to enhance coalescence of oil droplets within the aqueous phase, or both.

An eighth aspect can include the system of any one of the first to seventh aspects, wherein the separation vessel further comprises an electrostatic grid assembly configured to electrostatically coalesce water within the oil phase.

A ninth aspect can include the system of any one of the first to eighth aspects, wherein the system further comprises a mixture treatment, a wash fluid treatment, or both.

A tenth aspect can include the system of any one of the first to ninth aspects, wherein the system further comprises a preliminary separation vessel configured to receive a crude oil stream, to receive a brine from the separation vessel, and to transfer at least a portion of the crude oil stream to the separation vessel as the mixture.

In an eleventh aspect, a method of desalting and dehydrating crude oil comprises: distributing a mixture within a cavity of a separation vessel, wherein the mixture comprises crude oil, water, dissolved salts, free salts, or combinations thereof, wherein the separation vessel defines the cavity extending along a central axis, wherein the central axis has a substantially-vertical orientation; distributing a wash fluid within the cavity of the separation vessel, wherein the wash fluid comprises an aqueous fluid, and wherein the mixture is distributed within the cavity below the wash fluid; detecting an interface between an oil phase and an aqueous phase; and maintaining the interface within a predetermined range within the cavity.

A twelfth aspect can include the method of the eleventh aspect, wherein the interface level is configured to maintain the wash fluid as a continuous phase in the cavity and to maintain the mixture as a dispersed phase within the continuous phase in the cavity.

A thirteenth aspect can include the method of the twelfth aspect, wherein the predetermined range within the cavity is above a location where the mixture is distributed within the cavity.

A fourteenth aspect can include the method of the eleventh aspect, wherein the interface is selected to maintain the mixture as a continuous phase in the cavity and to maintain the wash fluid as a dispersed phase within the continuous phase in the cavity.

A fifteenth aspect can include the method of the fourteenth aspect, wherein the predetermined range within the cavity is below a location where the wash fluid is distributed within the cavity.

A sixteenth aspect can include the method of any one of the eleventh to fifteenth aspects, wherein a difference in density between the mixture and the wash fluid causes the crude oil to travel upwards within the cavity and the wash fluid to travel downwards within the cavity.

A seventeenth aspect can include the method of the sixteenth aspect, wherein, as the mixture travels upwards within the cavity and the wash fluid travels downwards within the cavity, the mixture interacts with the wash fluid such that the water, dissolved salts, and/or free salts within the mixture coalesce into the wash fluid.

An eighteenth aspect can include the method of the seventeenth aspect, wherein the coalescence of the water, dissolved salts, and/or free salts into the aqueous fluid forms a brine.

A nineteenth aspect can include the method of any one of the eleventh to eighteenth aspects, wherein maintaining the interface within the predetermined range within the cavity comprises communicating the brine out of the cavity.

A twentieth aspect can include the method of any one of the eleventh to nineteenth aspects, further comprising: communicating a crude oil stream into a preliminary separation vessel, communicating a brine from the separation vessel into the preliminary separation vessel, and communicating at least a portion of the crude oil stream to the separation vessel as the mixture. While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented. The particular naming of the components, capitalization of terms, the attributes, structures, or any other structural aspect is not mandatory or significant, and the mechanisms that implement the disclosure or its features may have different names, formats, or protocols. Also, the particular division of functionality between the various components described herein is merely exemplary, and not mandatory; functions performed by a single system component may instead be performed by multiple components, and functions performed by multiple components instead may be performed by a single component. Finally, it should be noted that the language used in the specification has been principally selected for readability and instructional purposes, and may not have been selected to delineate or circumscribe the subject matter.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. The word "exemplary" is used herein to mean "serving as an example, instance, or illustration." Any implementation described herein as "exemplary" is not necessarily to be construed as preferred or advantageous over other implementations. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system for crude oil desalting and dehydration, the system comprising:
 a separation vessel defining a cavity extending along a central axis, the central axis having a substantially-vertical orientation, the separation vessel comprising:
  a random or structured packing disposed within the cavity;
  a first distributor configured to distribute a mixture within the cavity of the separation vessel, wherein the mixture comprises crude oil, water, dissolved salts, free salts, or combinations thereof;

a second distributor configured to distribute a wash fluid within the cavity of the separation vessel, wherein the wash fluid comprises an aqueous fluid, and wherein the first distributor is disposed within the cavity below the second distributor; and an interface level controller configured to detect an interface between an oil phase and an aqueous phase and to maintain the interface within a predetermined range within the cavity.

2. The system of claim 1, wherein the interface level controller is configured to maintain the wash fluid as a continuous phase in the cavity and to maintain the mixture as a dispersed phase within the continuous phase in the cavity.

3. The system of claim 2, wherein the predetermined range within the cavity is above the second distributor.

4. The system of claim 1, wherein the interface level controller is configured to maintain the mixture as a continuous phase in the cavity and to maintain the wash fluid as a dispersed phase within the continuous phase in the cavity.

5. The system of claim 4, wherein the predetermined range within the cavity is below the first distributor.

6. The system of claim 1, wherein the separation vessel further comprises a first mechanical coalescer configured to enhance coalescence of water droplets within the oil phase, a second mechanical coalescer configured to enhance coalescence of oil droplets within the aqueous phase, or both.

7. The system of claim 1, wherein the separation vessel further comprises an electrostatic grid assembly configured to electrostatically coalesce water within the oil phase.

8. The system of claim 1, wherein the system further comprises a mixture treatment, a wash fluid treatment, or both.

9. The system of claim 1, wherein the system further comprises a preliminary separation vessel configured to receive a crude oil stream, to receive a brine from the separation vessel, and to transfer at least a portion of the crude oil stream to the separation vessel as the mixture.

10. A system for crude oil desalting and dehydration, the system comprising:

a separation vessel defining a cavity extending along a central axis, the central axis having a substantially-vertical orientation, the separation vessel comprising:

a first mechanical coalescer configured to enhance coalescence of water droplets within the oil phase, a second mechanical coalescer configured to enhance coalescence of oil droplets within the aqueous phase, or both;

a first distributor configured to distribute a mixture within the cavity of the separation vessel, wherein the mixture comprises crude oil, water, dissolved salts, free salts, or combinations thereof;

a second distributor configured to distribute a wash fluid within the cavity of the separation vessel, wherein the wash fluid comprises an aqueous fluid, and wherein the first distributor is disposed within the cavity below the second distributor; and an interface level controller configured to detect an interface between an oil phase and an aqueous phase and to maintain the interface within a predetermined range within the cavity.

11. The system of claim 10, wherein the separation vessel further comprises a random or structured packing disposed within the cavity.

12. The system of claim 10, wherein the separation vessel further comprises an electrostatic grid assembly configured to electrostatically coalesce water within the oil phase.

13. The system of claim 10, wherein the interface level controller is configured to maintain the wash fluid as a continuous phase in the cavity and to maintain the mixture as a dispersed phase within the continuous phase in the cavity.

14. The system of claim 10, wherein the predetermined range within the cavity is above the second distributor.

15. A system for crude oil desalting and dehydration, the system comprising:

a separation vessel defining a cavity extending along a central axis, the central axis having a substantially-vertical orientation, the separation vessel comprising:

an electrostatic grid assembly configured to electrostatically coalesce water within the oil phase;

a first distributor configured to distribute a mixture within the cavity of the separation vessel, wherein the mixture comprises crude oil, water, dissolved salts, free salts, or combinations thereof;

a second distributor configured to distribute a wash fluid within the cavity of the separation vessel, wherein the wash fluid comprises an aqueous fluid, and wherein the first distributor is disposed within the cavity below the second distributor; and an interface level controller configured to detect an interface between an oil phase and an aqueous phase and to maintain the interface within a predetermined range within the cavity.

16. The system of claim 15, wherein the separation vessel further comprises a random or structured packing disposed within the cavity.

17. The system of claim 16, wherein the separation vessel further comprises a first mechanical coalescer configured to enhance coalescence of water droplets within the oil phase, a second mechanical coalescer configured to enhance coalescence of oil droplets within the aqueous phase, or both.

18. The system of claim 16, wherein the interface level is configured to maintain the wash fluid as a continuous phase in the cavity and to maintain the mixture as a dispersed phase within the continuous phase in the cavity.

19. The system of claim 16, wherein the predetermined range within the cavity is above the second distributor.

* * * * *